(No Model.)

J. STROUHAL.
DEVICE FOR CAPTURING AND DESTROYING INSECTS.

No. 584,245. Patented June 8, 1897.

WITNESSES
Jos. A. Ryan
Amos H. Hart

INVENTOR
Joseph Strouhal
BY Munn & Co.
ATTORNEYS.

THE NORRIS PETERS CO., PHOTO-LITHO., WASHINGTON, D. C.

UNITED STATES PATENT OFFICE.

JOSEPH STROUHAL, OF BEEVILLE, TEXAS, ASSIGNOR OF ONE-HALF TO JOSEPH BARTON, FRANK DUDEK, AND ROGER W. ARCHER, OF SAME PLACE.

DEVICE FOR CAPTURING AND DESTROYING INSECTS.

SPECIFICATION forming part of Letters Patent No. 584,245, dated June 8, 1897.

Application filed June 12, 1896. Serial No. 595,356. (No model.)

*To all whom it may concern:*

Be it known that I, JOSEPH STROUHAL, a citizen of the United States, residing in Beeville, in Bee county, in the State of Texas, have invented a new and original method of destroying the Mexican cotton-boll weevil (*Anthonomus grandis boh*) and other insects that damage cotton while growing; and I do hereby declare that the following is a full, clear, and exact description of my invention, which will enable others skilled in the cultivation of cotton to use the same.

My invention is an improvement in the class of apparatus for capturing insects destructive to plants and vegetables. I have devised improved means for knocking the insects off into trays or pans, wherein they are destroyed by liquid poison.

Figure 1:
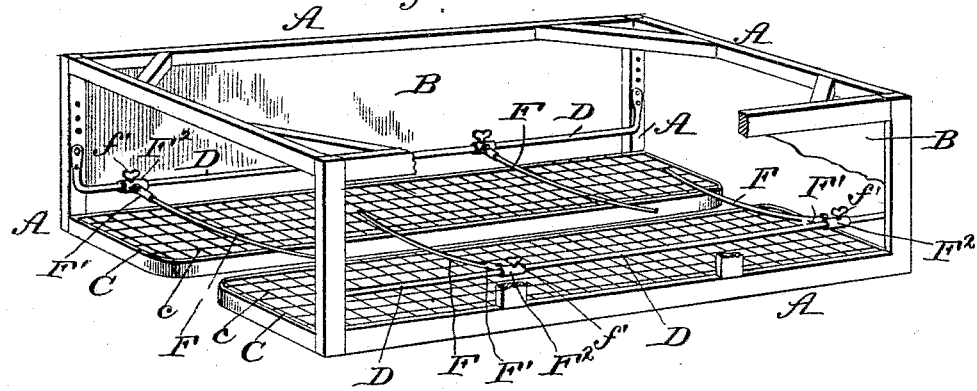
Figure 2:
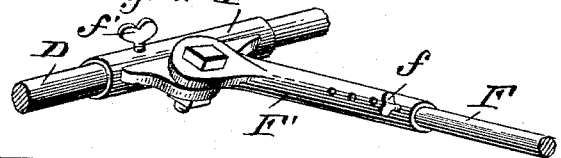
Figure 3:
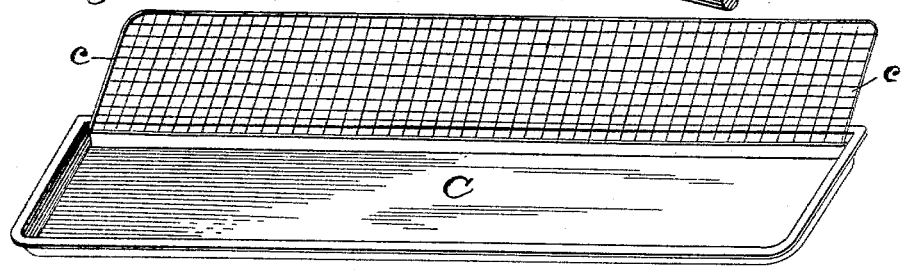
Figure 4:
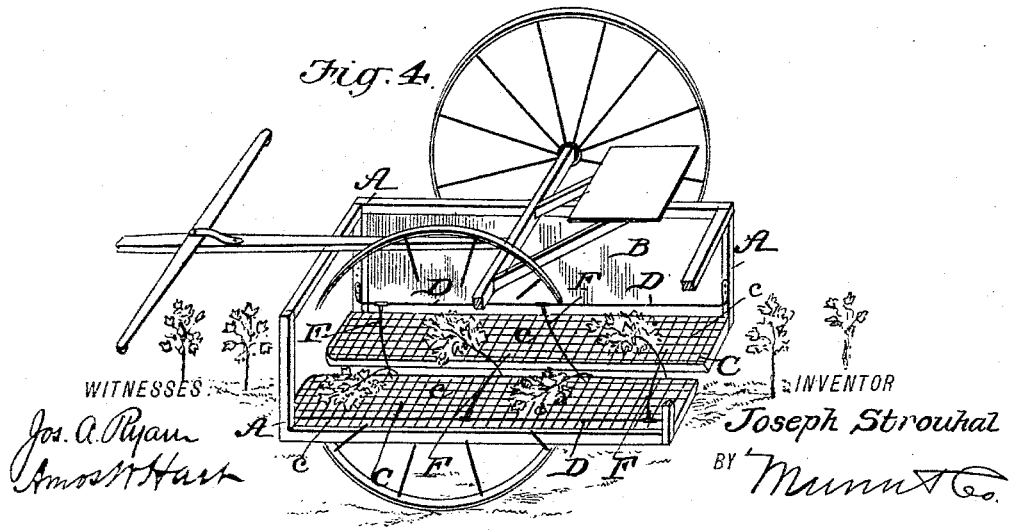

In accompanying drawings, two sheets, Figure 1 is a perspective view of the body of my improved apparatus. Fig. 2 is an enlarged view illustrating the attachment of one of the spring-arms and its adaptation for adjustment. Fig. 3 is a perspective view of one of the pans for containing poison, its hinged screen being shown open. Fig. 4 is a perspective view of my improved machine complete, a portion of one side being cut out to illustrate the action of the interior parts.

The oblong frame A has closed sides B and carries two pans C, which are arranged horizontally opposite each other, but separated by a space of sufficient width to permit the free passage of cotton-plants between them. Each pan C has a hinged wire screen c, Fig. 3, which is hinged and thus adapted to be conveniently opened to allow removal of the weevil or its eggs and its larvæ. The meshes of the screen are intended to be of such dimensions as to allow the weevil, &c., to pass through into the pan proper, but prevent passage of the cotton squares and bolls when detached from the stalk. The pans C fit in horizontal bottom portions of the frame A, which are suitably constructed to receive and hold them detachably.

On each side of the frame A, interiorly and just above a screen C, a rod D is arranged horizontally and adapted for vertical adjustment. On each such rod is secured at least two spring-arms F, which extend inward horizontally across the space between the pans C and preferably at a slight inclination rearward. Each arm (see Fig. 2) consists of a spring-rod set in a socket F' and made adjustable therein by a clamp-screw $f$. Said socket is bolted to a thimble or sleeve $F^2$, which is adapted for adjustment on rod D and is held by a clamp-screw $f'$ in the position required to hold the rod D at the required elevation. Thus the rods proper are adapted for longitudinal adjustment and also for adjustment vertically and horizontally to regulate their action on the cotton-plants.

Similar letters refer to similar parts throughout the several views.

A number of poisons are known that will kill the Mexican cotton-boll weevil, but when applied in solution of sufficient strength to kill the weevil the poison materially damages the cotton. The cotton does not come in contact with the poison in the use of my invention.

I have found that the most effective poison for the destruction of the weevil is a composition of spirits of turpentine, kerosene-oil, and crude carbolic acid.

The composition is mixed in the following proportions: spirits of turpentine, fifty-six (56) parts; kerosene-oil, forty (40) parts; crude carbolic acid, four (4) parts. The several parts or proportions are mixed together and placed in the pans so that the liquid will cover the bottom of the same about one-half inch in depth. The weevil and its eggs and larvæ and any other insect that feeds on and damages cotton being placed in the pan containing the above-described liquid will be immediately destroyed.

The operation of my invention is as follows: The entire frame work, with pans, screens, rods, and arms, connected and placed in position, is attached to a two-wheeled truck arranged to be drawn by two horses. In Figs. 1 and 4 one of the closed sides is cut out so that the interior parts of the machine may be seen. The poison is placed in the pans and the machine drawn over a row of cotton-plants, which passing through the open space between the pans the stalks are first struck by the forward arm F, which being placed at an angle across the open space between the pans and above the pan a sufficient distance to allow the cotton to pass through without damage the stalk is bent and the top thrown over on the screen opposite to the arm F and passes between the screen and said arm, being thus shaken during the operation, so that some of the weevil and other insects and punctured squares and bolls are dislodged and fall onto the screens. The stalk then straightens and is struck by the next arm F and bent and thrown against the other screen, thus going through the same operation as with the first arm F, and so on, passing the arms successively, thus bending the stalk four times in opposite directions and shaking and agitating it so that all the weevil, and squares and bolls punctured by the weevil, will be dislodged and fall onto the screens, the insects themselves passing through the screens and into the poison in the pans. When the screens have become covered with a quantity of squares and bolls, the pan may be drawn out and the insects and bolls and squares removed.

I have found that during the operation as above described a cloth made to fit in the bottom of the pan being saturated with the liquid is effectual in destroying the weevil, and is essential on account of the liquid often being thrown to one side or end of the pan while passing over uneven ground.

I claim as my invention and desire to secure by Letters Patent—

1. In an apparatus of the character described, the combination with two opposite pans separated by a narrow space, of a series of spring-arms projecting horizontally from opposite sides across the space between the pans, and attached alternately on opposite sides of the frame, as shown and described.

2. In an apparatus of the character described, the combination, with a frame and two receptacles arranged opposite each other but separated by a narrow space, of the spring striking-arms projecting across such space, and attached to suitable supports, as shown and described, whereby they are made adjustable at different angles, horizontally, to the inner and opposite edges of the pans, as specified.

3. In an apparatus of the character described, the combination, with the frame, and pans arranged oppositely, of spring-arms which project across the space between the pans, and are pivoted and clamped to devices that are rotatable and provided with means for clamping them in any adjustment, whereby the said arms may be inclined horizontally or vertically as desired.

JOSEPH STROUHAL.

Witnesses:
FRANK DUDEK,
R. W. ARCHER.